United States Patent Office

3,597,481
Patented Aug. 3, 1971

3,597,481
HETEROGENEOUS CATALYST FOR THE LIQUID PHASE HYDROLYSIS OF NITRILES TO AMIDES
Ben A. Tefertiller and Clarence E. Habermann, Midland, Mich., assignors to The Dow Chemical Company, Midland, Mich.
No Drawing. Filed Jan. 16, 1969, Ser. No. 791,807
Int. Cl. C07c 97/02
U.S. Cl. 260—561
9 Claims

ABSTRACT OF THE DISCLOSURE

Combinations consisting essentially of 10 to 90% by weight of oxides of copper, silver, zinc or cadmium and 10 to 90% by weight of oxides of chromium or molybdenum are used to catalyze the liquid phase conversion of nitriles to amides.

BACKGROUND OF THE INVENTION

Watanabe in "Bull. Chem. Soc., Japan" 32, 1280 (1959); 37, 1325 (1964); and 39, 8 (1966) has taught that aromatic amides may be prepared from aromatic nitriles by the use of nickel catalysts containing zinc, copper and aluminum. In an earlier work, Mahon in U.S. Pat. 2,421,030 taught the use of alumina and silica gel to convert nitriles to amides. More recently, Hoefele in U.S. Pat. 3,366,639 taught the use of manganese dioxide in the conversion of acrylonitrile to acrylamide.

SUMMARY OF THE INVENTION

According to the present invention, combinations consisting essentially of 10 to 90% by weight of at least one oxide of Cu, Ag, Zn or Cd and 10 to 90% by weight of at least one oxide of Cr or Mo are used as a heterogeneous catalyst for the liquid phase conversion of nitriles to amides in either a batch or a continuous flow process. In either process, the nitrile is converted to the amide upon contact with the catalytic site, the amide formed is separated and the unconverted reactants are recycled.

The catalysts of the present invention may suitably be any combination of 10 to 90% by weight of one or more of the oxides of Cu, Ag, Zn or Cd with 10 to 90% by weight of oxides of Cr and/or Mo. Of these various combinations, those combinations containing chromium oxide are preferred. In particular, the zinc oxide-chromium oxide, copper oxide-chromium oxide and cadmium oxide-chromium oxide binary combinations are superior catalysts with zinc oxide-chromium oxide being of special interest.

The catalysts of the invention may be prepared from the individual oxides by mixing, from coprecipitation of soluble salts or many of them may be purchased commercially. Coprecipitation of the soluble salts is the preferred method of preparing the catalysts.

Coprecipitation is accomplished by slowly adding an aqueous solution of a soluble salt of chromic or molybdic acid to a soluble salt of copper, silver, zinc or cadmium. The concentrations necessary to cause precipitation may easily be determined from the solubility product of the catalyst desired. Generally, if the concentration of each solution is 0.5 molar or greater, precipitation occurs. One molar concentrations are preferred.

The precipitate is thoroughly washed to remove the impurities, dried and calcined until no further weight loss occurs. The removal of the impurities is facilitated by the use of ammonium salts wherever possible because the ammonium ion may be removed by both washing and calcining.

The calcined precipitate obtained from the coprecipitation may require reduction for optimum activity. Reduction substantially increases the activity of the zinc oxide-chromium oxide and copper oxide-chromium oxide catalysts.

According to the invention, the concentration of the oxides of either group of metals, the Cu, Ag, Zn and Cd or the Cr and Mo, may suitably range from 10 to 90% by weight. As the components of the catalyst are altered, the weight percentages which give optimum activity may vary widely. As a general rule, greater activity is realized when the oxides of Cu, Ag, Zn and Cd comprise more than 50% by weight of the total catalyst.

Any nitrile may be used in the process of the invention so long as suitable mixing with water is obtained to convert the nitrile to the amide. Hydrocarbon nitriles containing up to 20 carbon atoms or more may suitably be used in the process of the invention. Aliphatic and aromatic nitriles which are suitable in the invention include: saturated aliphatic nitriles such as acetonitrile, propionitrile, pentanonitrile, dodecanonitrile and the like; unsaturated nitriles such as acrylonitrile, 2-butenonitrile, n-octadec-2-enonitrile and the like; and aromatic nitriles such as p-toluonitrile, benzonitrile, α-naphthonitrile, and the like. Of the nitriles which are suitable for use in the present reaction, the saturated and olefinic aliphatic nitriles of 2 to 6 carbon atoms are preferred. Of special interest in the present invention is the conversion of acrylonitrile to acrylamide.

The hydrolysis of the nitrile to the corresponding amide in the invention may be conducted in an essentially aqueous or essentially organic mixture. For an aqueous mixture, any practical amount of water may be added. Molar excesses of water up to 50 moles of water to 1 mole of nitrile are suitable with excesses of less than 40 to 1 being preferred. For an organic mixture, any practical excess of nitrile may be conveniently used. Molar excesses of 20 moles of nitrile to 1 mole of water are suitable with excesses of less than 10 to 1 being preferred. The organic mixture may also be prepared by the use of other organic solvents. Generally, these are not employed to create the organic media, but rather are used to increase the contact between the nitrile and water. Among the suitable solvents are other nitriles, dioxanes, dimethyl sulfoxide, acetone, 1,2-dimethoxyethane and tetrahydrofuran.

The temperature at which the nitriles are converted to the amides is basically a function of the reactants used in the process of the invention. Since the reaction of the present invention is a liquid phase hydrolysis, the melting and boiling points of the reaction mixture are the limiting factors of the range of reaction temperatures. As a practical matter, the suitable range of temperatures is from 0° to 400° C. with 25° to 200° C. being preferred. For unsaturated nitriles which tend to polymerize, a reaction temperature of less than 200° C. is desirable.

SPECIFIC EMBODIMENTS

Example 1

A zinc oxide-chromium oxide catalyst was prepared by mixing aqueous solutions of zinc chloride and ammonium chromate. Ammonium hydroxide was added to a solution of 126 grams of ammonium dichromate in 500 ml. of water to a total volume of 650 ml., where the color of the solution changed from orange to yellow. The color change observed in the solution indicated the transition of the dichromate ion to the chromate ion. To the ammonium chromate solution, 136 grams of zinc chloride dissolved in 300 ml. of water was added slowly with stirring. The precipitate formed upon mixing was separated and washed thoroughly with water. The filtered precipitate was dried overnight at 110° C. and then heated at 300° C. for 4 hours. The resulting chromate was reduced by a stream of hydrogen at 275° C. to produce the zinc oxide-chromium oxide catalyst.

Example 2

A copper oxide-chromium oxide catalyst for use in the preparation of amides from nitriles was prepared by reacting ammonium chromate with copper chloride. To 25 grams of ammonium dichromate dissolved in 100 ml. of water, 30 ml. of ammonium hydroxide was added to obtain ammonium chromate. To the ammonium chromate solution, a solution of 20.2 grams of cupric chloride dissolved in 150 ml. of water was added slowly with continuous agitation. The resulting precipitate was separated and washed several times with approximately one liter of water each time. The separated precipitate was dried at 110° C. for 8 hours and then heated at 275° C. in air for 3 hours. The precipitate was reduced by a stream of hydrogen at a temperature of 180° C. to product the copper oxide-chromium oxide catalyst.

Example 3

An aqueous conversion of acrylonitrile to acrylamide was accomplished by the use of a commercially obtained catalyst containing 74% zinc oxide and 21% chromium oxide and sold under the designation Harshaw Zn 0308. To a glass tube sealed at one end was added 1 gram of finely divided zinc oxide-chromium oxide catalyst and 5 grams of a 7% by weight solution of acrylonitrile in water. The tube was sealed and heated for 60 minutes at 155° C. with agitation. The tube was cooled rapidly in an ice bath and an aliquot was removed for analysis by vapor phase chromatography. The conversion of the acrylonitrile was found to be 89.5% with an 86.5% yield of acrylamide and a 2.5% of $\beta$-hydroxypropionitrile.

Example 4

The catalyst of Example 3 was used in a continuous flow reactor to hydrolyze an aqueous solution of acrylonitrile to acrylamide. The reaction chamber was a 400 cc. stainless steel pressure vessel having an inlet at one end and an outlet at the other end. The stainless steel reactor was filled with 588 grams of the zinc oxide-chromium oxide catalyst of Example 3. A solution of 7% by weight of acrylonitrile in water was passed continuously through the reactor at a rate of 400 ml. per hour while maintaining the temperature at 88° C. and a pressure of 150 p.s.i. The effluent product mixture was analyzed by vapor phase chromatography. After 240 hours of continuous running, the conversion of the acrylonitrile was 45% with a 98% yield of acrylamide and a 2% yield of $\beta$-hydroxypropionitrile. Good yields and conversions are obtained when the catalysts of Examples 1 and 2 are used in the processes of Examples 3 and 4.

Example 5

A catalyst of cadmium oxide-chromium oxide was prepared by the coprecipitation of a one molar solution of ammonium chromate with a one molar solution of cadmium nitrate. The precipitate formed was thoroughly washed with water, dried and calcined until no further weight loss occurred. One gram of the catalyst thus formed was added to a glass tube sealed at one end. The tube was then charged with a 7% by weight solution of acrylontrile in water. The tube was sealed and heated for 60 minutes at 135° C. with agitation. Conversion of the acrylonitrile was found to be 96.7% with 98.1% yield of acrylamide. No $\beta$-hydroxypropionitrile was formed.

Example 6

To a glass tube sealed at one end was added one gram of finely-divided copper oxide-chromium oxide catalyst sold under the trade name Calsicat 66–12–49–1B and 5 grams of 7% by weight solution of acrylonitrile in water. The tube was sealed and heated for 20 minutes at 155° C. with agitation. The tube was cooled rapidly in an ice bath and an aliquot was analyzed by vapor phase chromatography. The conversion of the acrylonitrile was found to be 45% with a 100% yield of acrylamide.

Example 7

To a glass tube sealed at one end was added one gram of finely-divided zinc oxide-chromium oxide catalyst sold under the trade name Harshaw Zn 0308 and 5 grams of a 7% by weight solution of acetonitrile in water. The tube was sealed and heated for 40 minutes at 155° C. with agitation. The tube was cooled rapidly in an ice bath and an aliquot was removed for analysis by vapor phase chromatography. The conversion of the acetonitrile was found to be 37% with a 81% yield of acetamide.

We claim:
1. The process for converting a nitrile to the corresponding amide comprising contacting a liquid mixture of the nitrile and water with a heterogeneous catalyst consisting essentially of 10 to 90% by weight oxides of silver, zinc or cadmium and 10 to 90% by weight of oxides of chromium at a temperature of 0 to 400° C.
2. The process defined in claim 1 wherein the catalyst is zinc oxide-chromium oxide, cadmium oxide-chromium oxide.
3. The process defined in claim 2 wherein the catalyst is zinc oxide-chromium oxide.
4. The process defined in claim 1 wherein the concentration of the oxide of Ag, Zn or Cd is greater than 50% by weight of the total catalyst.
5. The process defined in claim 1 wherein the nitrile contains up to 20 carbon atoms.
6. The process defined in claim 1 wherein the nitrile is an aliphatic nitrile of 2 to 6 carbon atoms.
7. The process defined in claim 1 wherein the nitrile converted is acrylonitrile.
8. The process defined in claim 1 wherein the temperature is 25° to 200° C.
9. The process defined in claim 1 wherein the catalyst is prepared by the coprecipitation of soluble salts.

References Cited
UNITED STATES PATENTS

| | | | |
|---|---|---|---|
| 3,040,095 | 6/1962 | Gilbert | 260—561 |
| 3,381,034 | 4/1968 | Greene et al. | 260—557 |
| 3,499,879 | 3/1970 | Kobayashi et al. | 260—88.7 |

ELBERT L. ROBERTS, Primary Examiner

E. G. LOVE, Assistant Examiner

U.S. Cl. X.R.

260—404, 465.6, 558